(12) United States Patent
Croak et al.

(10) Patent No.: US 8,155,295 B1
(45) Date of Patent: Apr. 10, 2012

(54) METHOD AND APPARATUS FOR TRACKING ALLOCATED PHONE NUMBERS

(75) Inventors: Marian Croak, Fair Haven, NJ (US); Hossein Eslambolchi, Los Altos Hills, CA (US)

(73) Assignee: AT&T Intellectual Property II, L.P., Atlanta, GA (US)

(*) Notice: Subject to any disclaimer, the term of this patent is extended or adjusted under 35 U.S.C. 154(b) by 517 days.

(21) Appl. No.: 11/272,385

(22) Filed: Nov. 10, 2005

(51) Int. Cl.
*H04M 3/42* (2006.01)
(52) U.S. Cl. ............. 379/201.12; 379/15.03; 379/88.17; 379/201.01; 379/221.13; 370/352
(58) Field of Classification Search ............. 379/221.13, 379/213.01, 230, 201.12, 201.03, 88.17, 379/201.01, 15.03; 370/352
See application file for complete search history.

(56) References Cited

U.S. PATENT DOCUMENTS

| 6,122,362 | A  | * | 9/2000  | Smith et al. ................ 379/230 |
| 6,298,352 | B1 | * | 10/2001 | Kannan et al. .............. 707/102 |
| 6,865,266 | B1 | * | 3/2005  | Pershan .................. 379/221.13 |
| 2004/0156394 | A1 | * | 8/2004 | Westman ..................... 370/471 |
| 2007/0207805 | A1 | * | 9/2007 | Pallares Lopez et al. ..... 455/436 |

* cited by examiner

*Primary Examiner* — Antim Shah (57) ABSTRACT

A method and apparatus for providing a method for determining the status of allocated phone numbers in a VoIP network by providing a tool to automatically determine whether allocated phone numbers are in service, deactivated, or waiting to be allocated phone numbers are disclosed. The present method enables access into service provisioning systems and their associated database regarding move, add, change, and disconnect operations to make this determination.

20 Claims, 5 Drawing Sheets

METHOD AND APPARATUS FOR TRACKING ALLOCATED PHONE NUMBERS

The present invention relates generally to communication networks and, more particularly, to a method and apparatus for tracking allocated VoIP phone numbers in communication networks, e.g., packet networks such as Voice over Internet Protocol (VoIP) networks.

BACKGROUND OF THE INVENTION

Providers of VoIP services are increasingly expected to provide services that are aligned with the governance of Public Switched Telephone Network (PSTN) services required by regulatory bodies. One instance of this is that regulatory bodies want to know the status of allocated phone numbers in a network. VoIP subscribers have a very high turnover rate and thus the status of phone numbers in the VoIP network is highly dynamic.

Therefore, a need exists for a method and apparatus for tracking allocated VoIP phone numbers in a packet network, e.g., a VoIP network.

SUMMARY OF THE INVENTION

In one embodiment, the present invention provides a method for determining the status of allocated phone numbers in a VoIP network by providing a tool to automatically determine whether allocated phone numbers are in service, deactivated, or waiting to be allocated phone numbers. The present invention enables access into service provisioning systems and their associated database regarding move, add, change, and disconnect operations to make this determination.

BRIEF DESCRIPTION OF THE DRAWINGS

The teaching of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
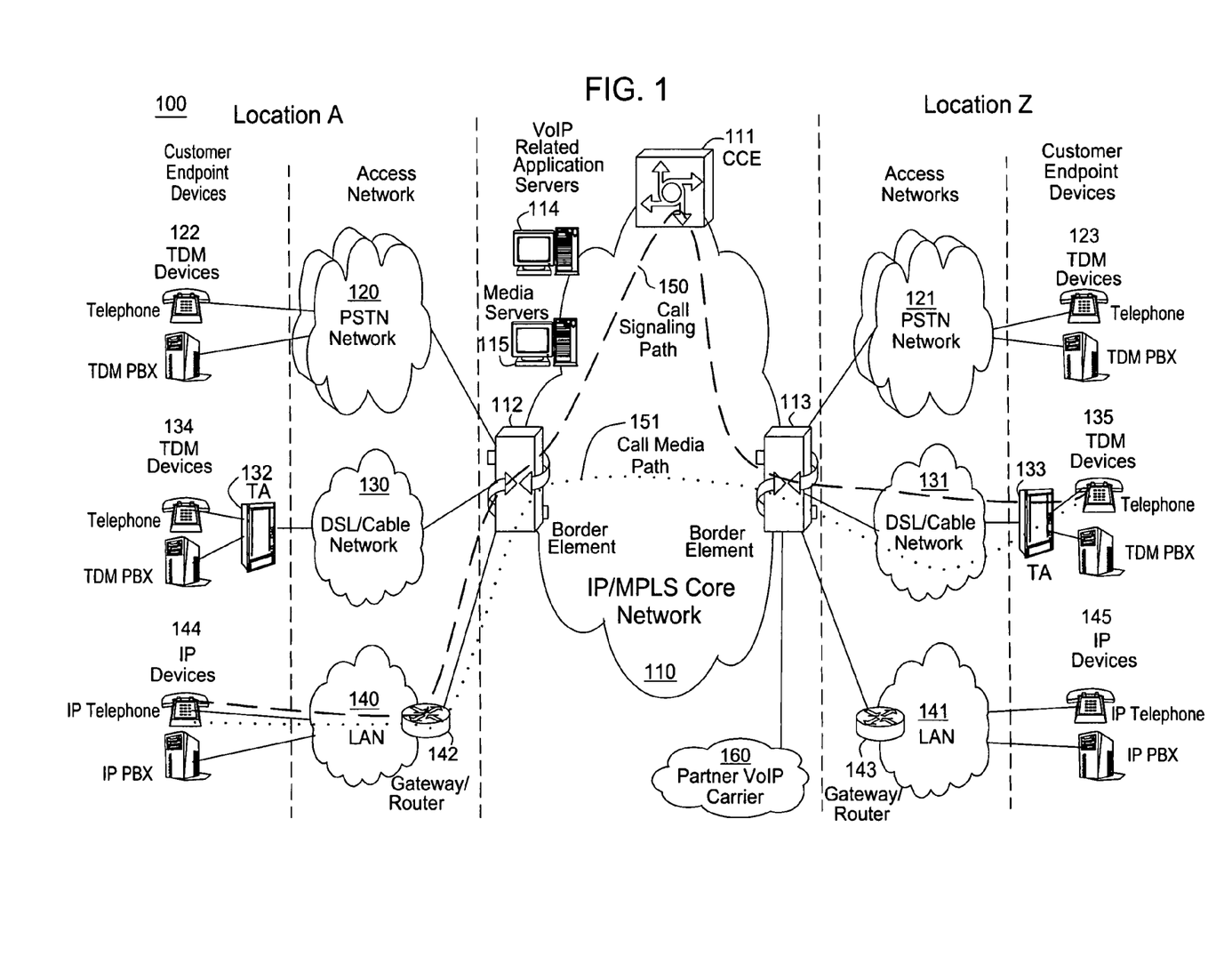
FIG. 1 illustrates an exemplary Voice over Internet Protocol (VoIP) network related to the present invention.

To better understand the present invention, FIG. 1 illustrates a communication architecture 100 having an example network, e.g., a packet network such as a VoIP network related to the present invention. Exemplary packet networks include internet protocol (IP) networks, asynchronous transfer mode (ATM) networks, frame-relay networks, and the like. An IP network is broadly defined as a network that uses Internet Protocol to exchange data packets. Thus, a VoIP network or a SoIP (Service over Internet Protocol) network is considered an IP network.

In one embodiment, the VoIP network may comprise various types of customer endpoint devices connected via various types of access networks to a carrier (a service provider) VoIP core infrastructure over an Internet Protocol/Multi-Protocol Label Switching (IP/MPLS) based core backbone network. Broadly defined, a VoIP network is a network that is capable of carrying voice signals as packetized data over an IP network. The present invention is described below in the context of an illustrative VoIP network. Thus, the present invention should not be interpreted to be limited by this particular illustrative architecture.

The customer endpoint devices can be either Time Division Multiplexing (TDM) based or IP based. TDM based customer endpoint devices 122, 123, 134, and 135 typically comprise of TDM phones or Private Branch Exchange (PBX). IP based customer endpoint devices 144 and 145 typically comprise IP phones or IP PBX. The Terminal Adaptors (TA) 132 and 133 are used to provide necessary interworking functions between TDM customer endpoint devices, such as analog phones, and packet based access network technologies, such as Digital Subscriber Loop (DSL) or Cable broadband access networks. TDM based customer endpoint devices access VoIP services by using either a Public Switched Telephone Network (PSTN) 120, 121 or a broadband access network via a TA 132 or 133. IP based customer endpoint devices access VoIP services by using a Local Area Network (LAN) 140 and 141 with a VoIP gateway or router 142 and 143, respectively.

The access networks can be either TDM or packet based. A TDM PSTN 120 or 121 is used to support TDM customer endpoint devices connected via traditional phone lines. A packet based access network, such as Frame Relay, ATM, Ethernet or IP, is used to support IP based customer endpoint devices via a customer LAN, e.g., 140 with a VoIP gateway and router 142. A packet based access network 130 or 131, such as DSL or Cable, when used together with a TA 132 or 133, is used to support TDM based customer endpoint devices.

The core VoIP infrastructure comprises of several key VoIP components, such the Border Element (BE) 112 and 113, the Call Control Element (CCE) 111, VoIP related Application Servers (AS) 114, and Media Server (MS) 115. The BE resides at the edge of the VoIP core infrastructure and interfaces with customers endpoints over various types of access networks. A BE is typically implemented as a Media Gateway and performs signaling, media control, security, and call admission control and related functions. The CCE resides within the VoIP infrastructure and is connected to the BEs using the Session Initiation Protocol (SIP) over the underlying IP/MPLS based core backbone network 110. The CCE is typically implemented as a Media Gateway Controller or a softswitch and performs network wide call control related functions as well as interacts with the appropriate VoIP service related servers when necessary. The CCE functions as a SIP back-to-back user agent and is a signaling endpoint for all call legs between all BEs and the CCE. The CCE may need to interact with various VoIP related Application Servers (AS) in order to complete a call that require certain service specific features, e.g. translation of an E.164 voice network address into an IP address.

For calls that originate or terminate in a different carrier, they can be handled through the PSTN 120 and 121 or the Partner IP Carrier 160 interconnections. For originating or terminating TDM calls, they can be handled via existing PSTN interconnections to the other carrier. For originating or terminating VoIP calls, they can be handled via the Partner IP carrier interface 160 to the other carrier.

In order to illustrate how the different components operate to support a VoIP call, the following call scenario is used to illustrate how a VoIP call is setup between two customer endpoints. A customer using IP device 144 at location A places a call to another customer at location Z using TDM device 135. During the call setup, a setup signaling message is sent from IP device 144, through the LAN 140, the VoIP Gateway/Router 142, and the associated packet based access network, to BE 112. BE 112 will then send a setup signaling message, such as a SIP-INVITE message if SIP is used, to CCE 111. CCE 111 looks at the called party information and queries the necessary VoIP service related application server 114 to obtain the information to complete this call. In one embodiment, the Application Server (AS) functions as a SIP back-to-back user agent. If BE 113 needs to be involved in completing the call; CCE 111 sends another call setup message, such as a SIP-INVITE message if SIP is used, to BE 113. Upon receiving the call setup message, BE 113 forwards the call setup message, via broadband network 131, to TA 133. TA 133 then identifies the appropriate TDM device 135 and rings that device. Once the call is accepted at location Z by the called party, a call acknowledgement signaling message, such as a SIP 200 OK response message if SIP is used, is sent in the reverse direction back to the CCE 111. After the CCE 111 receives the call acknowledgement message, it will then send a call acknowledgement signaling message, such as a SIP 200 OK response message if SIP is used, toward the calling party. In addition, the CCE 111 also provides the necessary information of the call to both BE 112 and BE 113 so that the call data exchange can proceed directly between BE 112 and BE 113. The call signaling path 150 and the call media path 151 are illustratively shown in FIG. 1. Note that the call signaling path and the call media path are different because once a call has been setup up between two endpoints, the CCE 111 does not need to be in the data path for actual direct data exchange.

Media Servers (MS) 115 are special servers that typically handle and terminate media streams, and to provide services such as announcements, teleconference bridges, transcoding, and Interactive Voice Response (IVR) messages for VoIP service applications.

Note that a customer in location A using any endpoint device type with its associated access network type can communicate with another customer in location Z using any endpoint device type with its associated network type as well. For instance, a customer at location A using IP customer endpoint device 144 with packet based access network 140 can call another customer at location Z using TDM endpoint device 123 with PSTN access network 121. The BEs 112 and 113 are responsible for the necessary signaling protocol translation, e.g., SS7 to and from SIP, and media format conversion, such as TDM voice format to and from IP based packet voice format.

Providers of VoIP services are increasingly expected to provide services that are aligned with the governance of Public Switched Telephone Network (PSTN) services required by regulatory bodies. One instance of this is that regulatory bodies want to know the status of allocated phone numbers in a network. VoIP subscribers have a very high turnover rate and thus the status of phone numbers in the VoIP network is highly dynamic.

To address this need, the present invention provides a method for determining the status of allocated phone numbers in a packet network, e.g., a VoIP network by providing a tool to automatically determine whether allocated phone numbers are in service, deactivated, or waiting to be allocated phone numbers. The present invention enables access into service provisioning systems and their associated database regarding move, add, change, and disconnect operations to make this determination.

Figure 2:
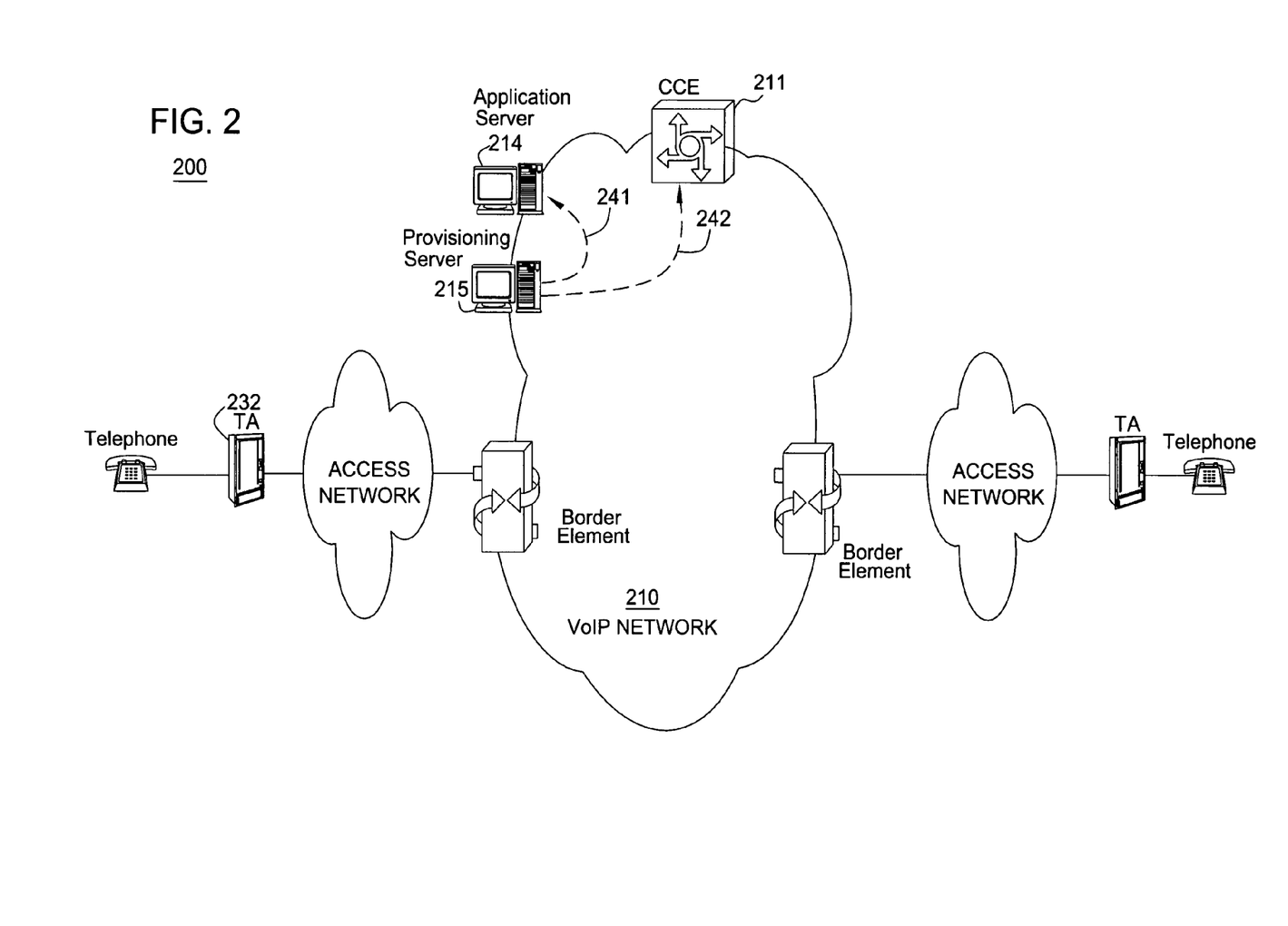
FIG. 2 illustrates an example of tracking allocated VoIP phone numbers in a VoIP network of the present invention.

FIG. 2 illustrates an example 200 of tracking allocated VoIP phone numbers in a packet network, e.g., a VoIP network of the present invention. In FIG. 2, the network provider of VoIP network 210 keeps track of all allocated phone numbers in the network. Initially, the network provider is allocated a pool of 10 digit phone numbers that will be assigned to subscribers. Phone numbers can be acquired by the network provider from various Local Exchange Carriers (LEC). The allocated phone numbers may go through different states during the lifetime of these allocated phone numbers. In essence, the total number of allocated phone number equals to the sum of the total number of in service phone numbers, the total number of deactivated phone numbers, and the total number of allocated phone numbers waiting to be assigned. Allocated phone numbers waiting to be assigned are phone numbers that are available to be assigned to VoIP endpoints. In service phone numbers are phone numbers that are in active service used by VoIP endpoints. Deactivated phone numbers are phone numbers that have been disconnected for services but have not yet returned to the allocated phone numbers waiting to be assigned pool. A deactivated phone number will be returned to the allocated phone numbers waiting to be assigned pool after a predefined period of time. The predefined period of time is a configurable parameter set by the network provider.

For instance, when a subscriber signs up for VoIP services using TA 232, a 10 digit phone number will be assigned by the network provider to be associated with TA 232. This process is known as an add operation in which an allocated phone number that is waiting to be assigned is assigned to a subscriber by Provisioning Server (PS) 215. Therefore, the total number of allocated phone numbers waiting to be assigned is decremented by one and the total number of in service phone numbers is incremented by one in PS 215. In addition, PS 215 will update AS 214 and CCE 211 accordingly using flow 241 and flow 242 respectively to perform the add operation to activate VoIP services for the new subscriber. In some instances, a subscriber may port a 10 digit phone number that has been allocated by another service provider to the subscriber to the network provider of VoIP network 210 to sign up for VoIP services. In this case, no phone number from the allocated phone number pool of VoIP network 210 needs to be assigned and VoIP network 210 will gain a ported phone number from the subscriber. PS 215, in this case, will increment the total number of allocated phone number by one and the total number of in service phone numbers by one. In addition, PS 215 will update AS 214 and CCE 211 accordingly using flow 241 and flow 242 respectively to perform the add operation to activate VoIP services for the new subscriber.

From time to time, a subscriber may decide to disconnect the subscribed VoIP services with the network provider of VoIP network 210 without keeping the previously assigned phone number. This is known as a disconnect operation. In this case, PS 215 will decrement the total number of in service phone numbers by one and increment the total number of deactivated phone numbers by one. In addition, PS 215 will update AS 214 and CCE 211 accordingly using flow 241 and flow 242 respectively to perform the disconnect operation to deactivate VoIP services for the subscriber. Note that a deactivated phone number is eventually returned to the allocated phone numbers waiting to be assigned pool to be reused after a predefined period of time. When that happens, the total number of deactivated phone numbers will be decremented by one and the total number of allocated phone numbers waiting to assigned will be incremented by one by PS 215.

In some instance, a subscriber decides to disconnect the subscribed services and port a previously assigned phone number from the network provider of VoIP network 210 to another service provider. In this case, PS 215 will decrement the total number of allocated phone numbers by one and the total number of in service phone numbers by one. In addition, PS 215 will update AS 214 and CCE 211 accordingly using flow 241 and flow 242 respectively to perform the disconnect operation to deactivate VoIP services for the subscriber.

From time to time, the network provider of VoIP network 210 can acquire additional or relinquish existing allocated numbers from or to the LEC that have controls of phone numbers for local services. In that case, the total number of allocated phone numbers will be adjusted to reflect the new additions of allocated phone numbers by PS 215.

Figure 3:
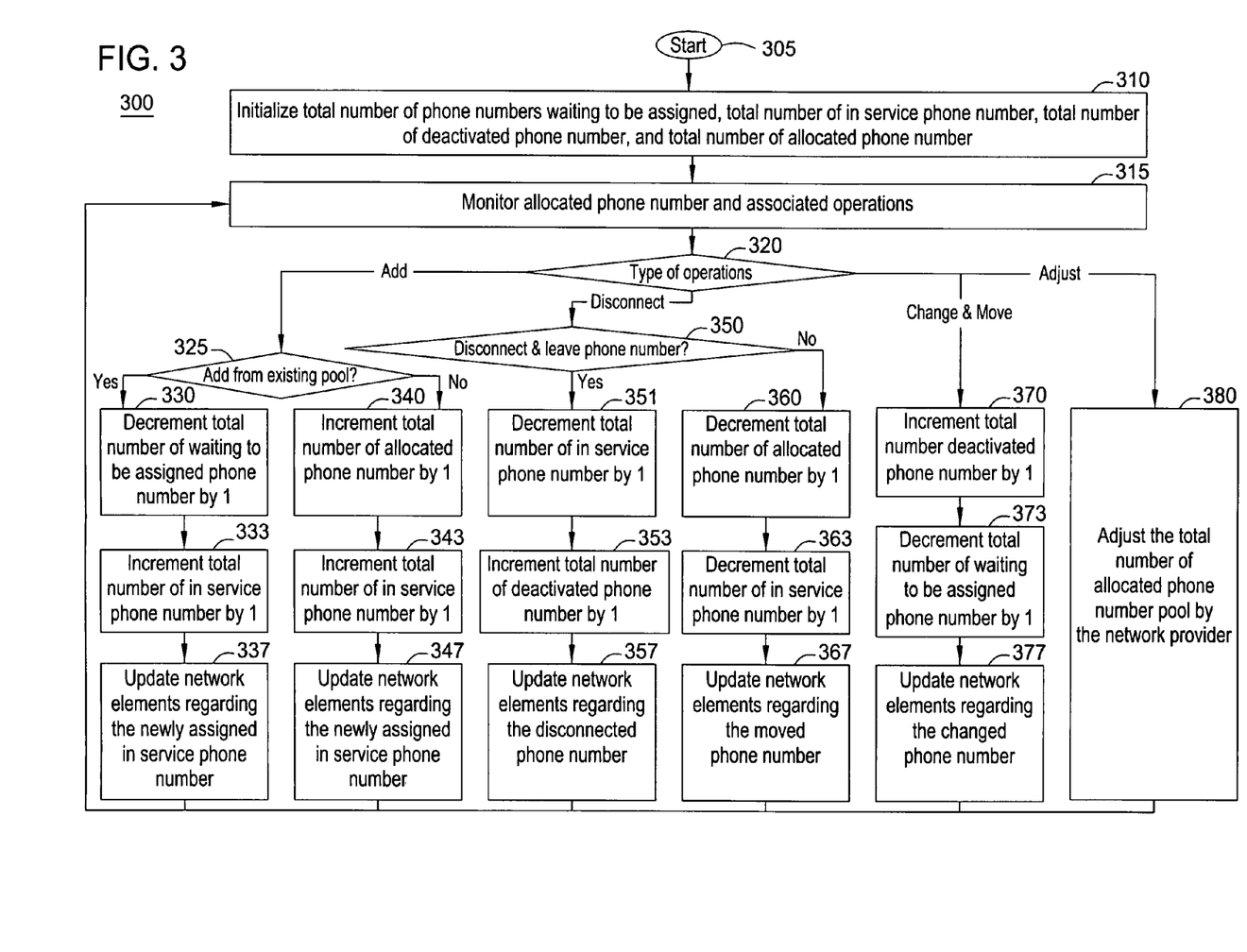
FIG. 3 illustrates a flowchart of a method for tracking allocated VoIP phone numbers in a packet network, e.g., a VoIP network, of the present invention.

From time to time, a subscriber may decide to change a subscribed phone number to another phone number for various reasons. This is known as a change operation. In addition, a subscriber may move the service address from one location to another location and the subscriber may like to be assigned a new phone number instead. This is known as a move operation. In these cases, PS 215 will increment the total number of deactivated phone numbers by one and decrement the total number of allocated phone numbers waiting to be assigned by one. In addition, PS 215 will update AS 214 and CCE 211 accordingly using flow 241 and flow 242 respectively to perform the change operation to modify VoIP services for the subscriber FIG. 3 illustrates a flowchart of a method 300 for tracking allocated VoIP phone numbers in a packet network, e.g., a VoIP network, of the present invention. Method 300 is executed by the Provisioning Server. Method 300 starts in step 305 and proceeds to step 310.

In step 310, the method Initialize total number of allocated phone numbers waiting to be assigned, the total number of in service phone numbers, total number of deactivated phone numbers, and total number of allocated phone numbers accordingly. These numbers are initialized depending on the state of the network when a Provisioning Server (PS) that performs allocated phone number tracking system is introduced in the network. These numbers are initialized by a PS.

In step 315, the method monitors all allocated phone numbers and their associated operations. For example, the associated operations are monitored by the PS.

In step 320, the method checks the type of operations associated with a particular phone number. If the type of operations is an add operation, the method proceeds to step 325. If the type of operations is a disconnect operation, the method proceeds to step 350. If the type of operations is a change or a move operation, the method proceeds to step 370. If the type of operations is an adjust operation, the method proceeds to step 380.

In step 325, the method checks if the add operation is to be performed using a phone number from the existing allocated phone number pool or a phone number ported from another service provider. If the add operation is to be performed using a phone number from the existing allocated phone number pool, the method proceeds to step 330; otherwise, the method proceeds to step 340.

In step 330, the method decrements the total number of allocated phone numbers waiting to be assigned by one. In step 333, the method increments the total number of in service phone numbers by one. In step 337, the method updates the appropriate VoIP network elements regarding the newly assigned in service phone number accordingly.

In step 340, the method increments the total number of allocated phone numbers by one. In step 343, the method increments the total number of in service phone numbers by one. In step 347, the method updates the appropriate VoIP network elements regarding the newly assigned in service phone number accordingly.

In step 350, the method checks if the disconnect operation involves the subscriber leaving the previously assigned phone number behind to the network provider or porting the previously assigned phone number to a different service provider. If the disconnect operation involves the subscriber leaving the previously assigned phone number behind to the network provider, the method proceeds to step 351; otherwise, the method proceeds to step 360.

In step 351, the method decrements the total number of in service phone numbers by one. In step 353, the method increments the total number of deactivated phone numbers by one. In step 357, the method updates the appropriate network elements regarding the disconnected phone number accordingly.

In step 360, the method decrements the total number of allocated phone numbers by one. In step 363, the method decrements the total number of in service phone numbers by one. In step 367, the method updates the appropriate network elements regarding the disconnected phone number accordingly.

In step 370, the method increments the total number of deactivated phone numbers by one. In step 373, the method decrements the total number of phone numbers waiting to be assigned by one. In step 377, the method updates the appropriate network elements regarding the changed or moved phone number accordingly.

In step 380, the method adjusts the total number of allocated phone numbers accordingly. For instance, allocated phone numbers can be added or removed from the existing allocated phone numbers pool for network operations purposes.

Figure 4:
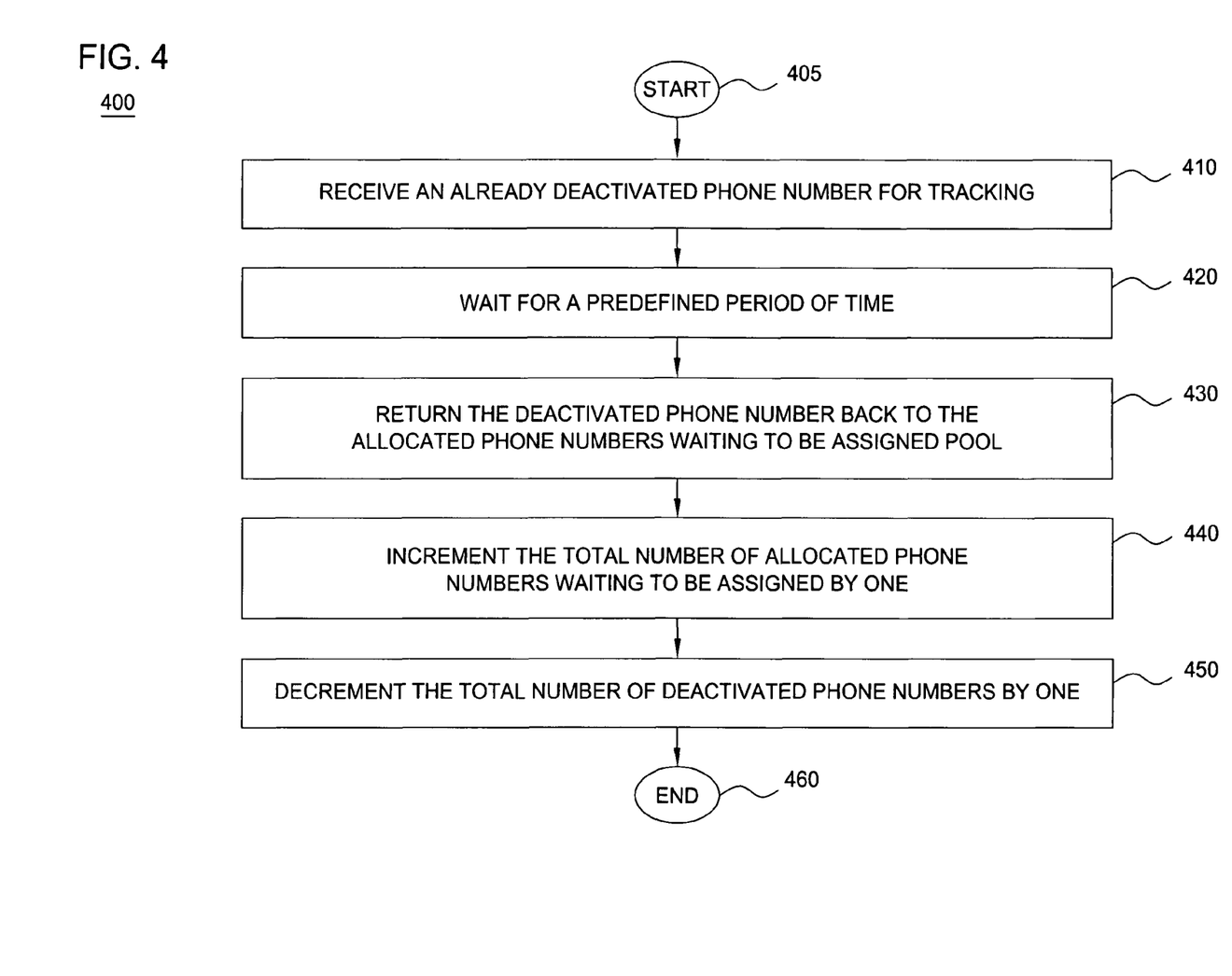
FIG. 4 illustrates a flowchart of a method for updating deactivated VoIP phone numbers in a packet network, e.g., a VoIP network, of the present invention.

FIG. 4 illustrates a flowchart of a method 400 for updating deactivated VoIP phone numbers in a packet network, e.g., a VoIP network, of the present invention. For example, method 400 is executed by the Provisioning Server. Method 400 starts in step 405 and proceeds to step 410.

In step 410, the method receives an already deactivated phone number for tracking.

In step 420, the method waits for a predefined period of time (e.g., 6 months, 9 months, and so on). The predefined period of time is a configurable parameter set by the network provider.

In step 430, the method returns the deactivated phone number to the allocated phone number waiting to be assigned pool.

In step 440, the method increments the total number of allocated phone numbers waiting to be assigned by one.

In step 450, the method decrements the total number of deactivated phone numbers by one. The method ends in step 460.

Figure 5:
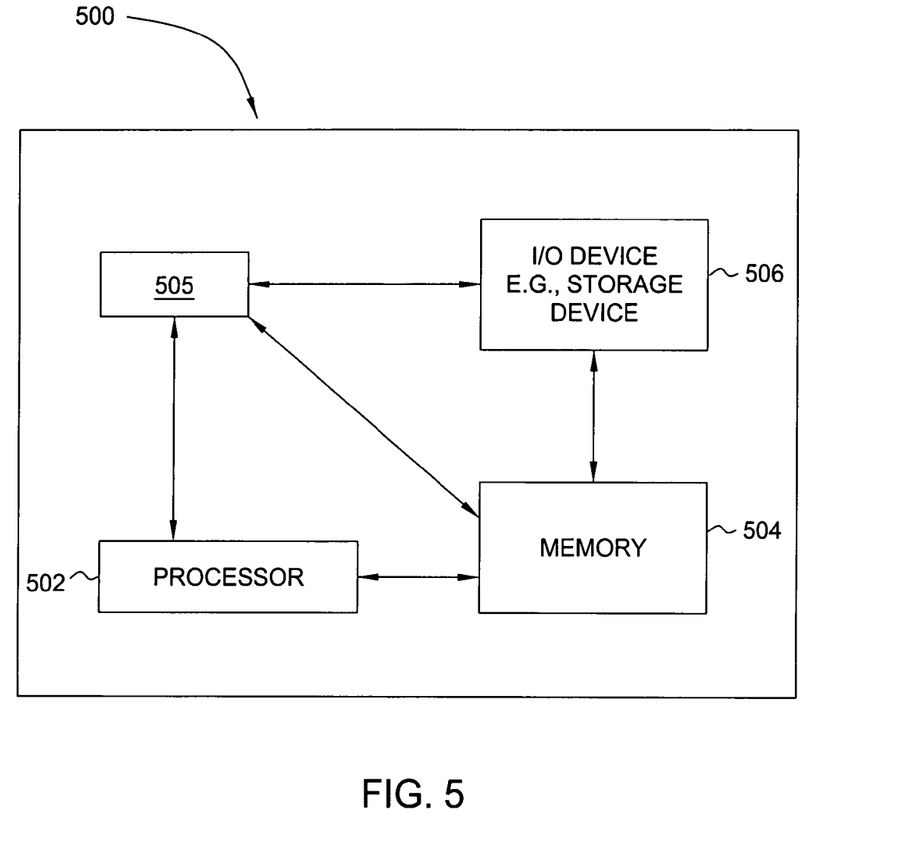
FIG. 5 illustrates a high level block diagram of a general purpose computer suitable for use in performing the functions described herein.

FIG. 5 depicts a high level block diagram of a general purpose computer suitable for use in performing the functions described herein. As depicted in FIG. 5, the system 500 comprises a processor element 502 (e.g., a CPU), a memory 504, e.g., random access memory (RAM) and/or read only memory (ROM), a module 505 for tracking allocated VoIP phone numbers, and various input/output devices 506 (e.g., storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like)).

It should be noted that the present invention can be implemented in software and/or in a combination of software and hardware, e.g., using application specific integrated circuits (ASIC), a general purpose computer or any other hardware equivalents. In one embodiment, the present module or process 505 for tracking allocated VoIP phone numbers can be loaded into memory 504 and executed by processor 502 to implement the functions as discussed above. As such, the present process 505 for tracking allocated VoIP phone numbers (including associated data structures) of the present invention can be stored on a computer readable medium or carrier, e.g., RAM memory, magnetic or optical drive or diskette and the like.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for tracking allocated internet protocol phone numbers in a communication network, comprising:
monitoring all of a pool of allocated internet protocol phone numbers, wherein the pool of allocated internet protocol phone numbers comprises a sum of a total number of waiting to be assigned phone numbers, a total number of deactivated phone numbers and a total number of in service phone numbers;
receiving a request related to a voice over internet protocol service from a telephone adapter:
in response to the request, updating a status of the pool of allocated internet protocol phone numbers according to an operation associated with the pool of allocated internet protocol phone numbers, wherein the operation comprises a group of options, wherein the group of options includes an add operation, a change operation, a move operation, a disconnect operation and an adjust operation, wherein the move operation comprises when a subscriber moves a service address from one location to another location; and
in response to the request, updating a voice over internet protocol service related application server and a call control element via a provisioning server to perform the operation in the communication network, wherein the call control element performs a translation of an E.164 voice network address into an internet protocol address, wherein the communication network is an internet protocol network, wherein the provisioning server is operated by a network provider of the communication network, comprising:
updating a network element in the communication network regarding a newly assigned in service phone number if the operation is the add operation;
updating a network element in the communication network regarding a disconnected phone number if the operation is the disconnect operation;
updating a network element in the communication network regarding a changed phone number if the operation is the change operation; or
updating a network element in the communication network regarding a moved phone number if the operation is the move operation.

2. The method of claim 1, wherein the pool of allocated Internet protocol phone numbers is monitored by the provisioning server.

3. The method of claim 1, wherein the add operation comprises:
decrementing the total number of waiting to be assigned phone numbers by 1 and incrementing the total number of in service phone numbers by 1 if the add operation involves using a phone number from the pool of allocated Internet protocol phone numbers.

4. The method of claim 1, wherein the change operation comprises:
incrementing the total number of deactivated phone numbers by 1; and
decrementing the total number of waiting to be assigned phone numbers by 1.

5. The method of claim 1, wherein the disconnect operation comprises:
decrementing the total number of in service phone numbers by 1 and incrementing the total number of deactivated phone numbers by 1 if the disconnect operation involves leaving a disconnected phone number by a subscriber to a network provider of the communication network.

6. The method of claim 5, wherein the disconnect operation further comprises:
incrementing the total number of allocated phone numbers waiting to be assigned by 1 and decrementing the total number of deactivated phone numbers by 1 after a predefined period of time.

7. The method of claim 1, wherein the adjust operation comprises:
increasing a total number of allocated phone numbers by a number of phone numbers added to the pool of allocated internet protocol phone numbers.

8. The method of claim 1, wherein the add operation comprises:
incrementing a total number of allocated phone numbers by 1 and incrementing the total number of in service phone numbers by 1 if the add operation involves using a phone number that is ported from a different network provider.

9. The method of claim 1, wherein the disconnect operation comprises:
decrementing a total number of allocated phone numbers by 1 and decrementing the total number of in service phone number by 1 if the disconnect operation involves porting the disconnected phone numbers by the subscriber from the communication network to a different network provider.

10. The method of claim 1, wherein the adjust operation comprises:
decreasing the total number of allocated phone numbers by a number of phone numbers removed from the pool of allocated internet protocol phone numbers.

11. The method of claim 1, wherein the move operation comprises:
incrementing the total number of deactivated phone numbers by 1; and
decrementing the total number of waiting to be assigned phone numbers by 1.

12. A non-transitory computer-readable medium having stored thereon a plurality of instructions, the plurality of instructions including instructions which, when executed by a processor, cause the processor to perform a method for tracking allocated internet protocol phone numbers in a communication network, comprising:
monitoring all of a pool of allocated internet protocol phone numbers, wherein the pool of allocated internet protocol phone numbers comprises a sum of a total number of waiting to be assigned phone numbers, a total number of deactivated phone numbers and a total number of in service phone numbers;

receiving a request related to a voice over internet protocol service from a telephone adapter;

in response to the request, updating a status of the pool of allocated internet protocol phone numbers according to an operation associated with the pool of allocated internet protocol phone numbers, wherein the operation comprises a group of options, wherein the group of options includes an add operation, a change operation, a move operation, a disconnect operation and an adjust operation, wherein the move operation comprises when a subscriber moves a service address from one location to another location; and in response to the request, updating a voice over internet protocol service related application server and a call control element via a provisioning server to perform the operation in the communication network, wherein the call control element performs a translation of an E.164 voice network address into an internet protocol address, wherein the communication network is an Internet protocol network, wherein the provisioning server is operated by a network provider of the communication network, comprising:

updating a network element in the communication network regarding a newly assigned in service phone number if the operation is the add operation;

updating a network element in the communication network regarding a disconnected phone number if the operation is the disconnect operation;

updating a network element in the communication network regarding a changed phone number if the operation is the change operation; or updating a network element in the communication network regarding a moved phone number if the operation is the move operation.

13. The non-transitory computer-readable medium of claim 12, wherein the pool of allocated internet protocol phone numbers is monitored by the provisioning server.

14. The non-transitory computer-readable medium of claim 12, wherein the add operation comprises:

decrementing the total number of waiting to be assigned phone numbers by 1 and incrementing the total number of in service phone numbers by 1 if the add operation involves using a phone number from the pool of allocated internet protocol phone numbers.

15. The non-transitory computer-readable medium of claim 12, wherein the change operation comprises:

incrementing the total number of deactivated phone numbers by 1; and decrementing the total number of waiting to be assigned phone numbers by 1.

16. The non-transitory computer-readable medium of claim 12, wherein the disconnect operation comprises:

decrementing the total number of in service phone numbers by 1 and incrementing the total number of deactivated phone numbers by 1 if the disconnect operation involves leaving a disconnected phone number by a subscriber to a network provider of the communication network.

17. The non-transitory computer-readable medium of claim 12, wherein the move operation comprises:

incrementing the total number of deactivated phone numbers by 1; and decrementing the total number of waiting to be assigned phone numbers by 1.

18. The non-transitory computer-readable medium of claim 12, wherein the add operation comprises:

incrementing a total number of allocated phone numbers by 1 and incrementing the total number of in service phone numbers by 1 if the add operations involves using a phone number that is ported from a different network provider.

19. The non-transitory computer-readable medium of claim 12, wherein the disconnect operation comprises:

decrementing a total number of allocated phone numbers by 1 and decrementing the total number of in service phone number by 1 if the disconnect operation involves porting the disconnected phone numbers by the subscriber from the communication network to a different network provider.

20. An apparatus for tracking allocated internet protocol phone numbers in a communication network, comprising:

a processor; and a non-transitory computer-readable medium in communication with the processor, wherein the computer-readable medium having stored thereon a plurality of instructions, the plurality of instructions including instructions which, when executed by the processor, cause the processor to perform a method, comprising:

monitoring all of a pool of allocated internet protocol phone numbers, wherein the pool of allocated internet protocol phone numbers comprises a sum of a total number of waiting to be assigned phone numbers, a total number of deactivated phone numbers and a total number of in service phone numbers;

receiving a request related to a voice over internet protocol service from a telephone adapter;

in response to the request, updating a status of the pool of allocated internet protocol phone numbers according to an operation associated with the pool of allocated internet protocol phone numbers, wherein the operation comprises a group of options, wherein the group of options includes an add operation, a change operation, a move operation, a disconnect operation and an adjust operation, wherein the move operation comprises when a subscriber moves a service address from one location to another location; and in response to the request, for updating a voice over internet protocol service related application server and a call control element via a provisioning server to perform the operation in the communication network, wherein the call control element performs a translation of an E.164 voice network address into an internet protocol address, wherein the communication network is an internet protocol network, wherein the provisioning server is operated by a network provider of the communication network, comprising:

updating a network element in the communication network regarding a newly assigned in service phone number if the operation is the add operation;

updating a network element in the communication network regarding a disconnected phone number if the operation is the disconnect operation;

updating a network element in the communication network regarding a changed phone number if the operation is the change operation; or updating a network element in the communication network regarding a moved phone number if the operation is the move operation.

* * * * *